US006536329B2

(12) United States Patent
Anderson et al.

(10) Patent No.: US 6,536,329 B2
(45) Date of Patent: Mar. 25, 2003

(54) BRAKE ACTUATOR HAVING TAMPER RESISTANT RIVETED SPRING CHAMBER

(75) Inventors: Maurice Anderson, Lawson, MO (US); David Rhoads, Boonville, MO (US)

(73) Assignee: Haldex Brake Corporation, Kansas City, MO (US)

( * ) Notice: Subject to any disclaimer, the term of this patent is extended or adjusted under 35 U.S.C. 154(b) by 11 days.

(21) Appl. No.: 09/833,497

(22) Filed: Apr. 12, 2001

(65) Prior Publication Data

US 2002/0148351 A1 Oct. 17, 2002

(51) Int. Cl.⁷ .............................. F01B 7/00; F01B 19/00
(52) U.S. Cl. ................. 92/63; 92/98 R; 92/64
(58) Field of Search .................. 92/98 R, 62, 63, 92/64

(56) References Cited

U.S. PATENT DOCUMENTS

| | | | |
|---|---|---|---|
| 2,355,721 A | * | 8/1944 | Foutz ................ 92/98 R |
| 2,670,098 A | | 2/1954 | Thompson |
| 2,929,216 A | * | 3/1960 | Stelzer ................ 92/99 |
| 3,499,574 A | | 3/1970 | Yates, Jr. |
| 3,510,023 A | | 5/1970 | Ullman et al. |
| 3,610,306 A | | 10/1971 | Summers |
| 3,642,166 A | | 2/1972 | Starr |
| 3,809,304 A | | 5/1974 | Flanders |
| 3,851,788 A | | 12/1974 | Hammes |
| 4,166,549 A | | 9/1979 | Schütz et al. |
| 4,480,530 A | | 11/1984 | Holmes |
| 4,745,849 A | | 5/1988 | Emilsson et al. |
| 4,778,074 A | | 10/1988 | Kelly |
| 4,850,263 A | | 7/1989 | Rumsey et al. |
| 4,887,513 A | | 12/1989 | Ewald et al. |
| 4,960,036 A | | 10/1990 | Gummer et al. |
| 4,960,038 A | * | 10/1990 | Chiba et al. ................ 92/100 |
| 5,062,455 A | | 11/1991 | Schurter et al. |
| 5,067,391 A | | 11/1991 | Choinski et al. |
| 5,205,205 A | | 4/1993 | Choinski et al. |
| 5,263,403 A | | 11/1993 | Choinski et al. |
| 5,285,716 A | | 2/1994 | Thompson |
| 5,311,809 A | | 5/1994 | Choinski et al. |
| 5,315,918 A | | 5/1994 | Pierce |
| 5,353,688 A | | 10/1994 | Pierce et al. |
| 5,433,138 A | | 7/1995 | Choinski et al. |
| 5,487,484 A | | 1/1996 | Bonniau et al. |
| 5,516,247 A | * | 5/1996 | Hosoda et al. ............. 411/166 |
| 5,560,280 A | | 10/1996 | Rumsey |
| 5,621,183 A | | 4/1997 | Bailey |
| 5,640,894 A | | 6/1997 | Zarybnicky, Sr. et al. |
| 6,050,372 A | | 4/2000 | Fisher |
| 6,081,984 A | * | 7/2000 | Sherry ................ 29/432.2 |

FOREIGN PATENT DOCUMENTS

GB 2 000 225 A 6/1978

* cited by examiner

Primary Examiner—Edward K. Look
Assistant Examiner—Michael Leslie
(74) Attorney, Agent, or Firm—St. Onge Steward Johnston & Reens LLC

(57) ABSTRACT

A spring brake actuator having a flange case and a head is provided. The flange case and the head each have a radially outwardly extending annular flange having a plurality of radially spaced apart axial holes passing therethrough which correspond to and align with each other. A diaphragm is clamped in a fluid tight manner between the annular flange of the head and the annular flange of the flange case. A plurality of disassembleable fastening members pass through the holes in the annular flange of the head and the holes in the annular flange of the flange case in order to undetachably secure the head on the flange case.

22 Claims, 3 Drawing Sheets

BRAKE ACTUATOR HAVING TAMPER RESISTANT RIVETED SPRING CHAMBER

FIELD OF THE INVENTION

The present invention relates generally to braking systems and, more specifically, to brake actuators. Even more particularly, the present invention relates to a tamper-resistant riveted spring brake actuator and a method of assembling the same.

BACKGROUND OF THE INVENTION

Fluid-operated braking systems have long been used to control the movement of motor vehicles in a safe and effective manner. In particular, air brakes are commonly used on commercial vehicles such as trucks, which typically have large gross vehicle weights. The considerable inertial mass of these heavy-duty vehicles in combination with the high speeds at which they travel requires a braking system which responds rapidly with substantial braking power. One system component which is instrumental in the operation of air brake systems is the brake actuator, which provides the force necessary when braking a vehicle.

In a typical double diaphragm spring brake actuator, a barrel-shaped power spring stores potential energy and exerts the large force required for braking in case of air pressure failure. Air pressure acting on a diaphragm compresses the power spring and maintains it in its brake release position. When the air is exhausted, the power spring acts on the diaphragm, typically an elastomeric diaphragm or a piston, and thereby applies the brakes in case of failure of the system air pressure.

The power spring is positioned in a spring chamber, which is typically formed by clamping an elastomeric diaphragm between a head (sometimes also known as a spring housing or spring chamber) and a flange case (sometimes known as an adaptor). The power spring is compressed within the spring chamber between the head and the diaphragm. The power spring has a high spring constant and is normally compressed to a height of less than 3 inches from an original uncompressed height of from 9 to 12 inches. The power spring, therefore, stores a substantial amount of potential energy, usually exerting a force on the head of about 2,000 to 3,000 pounds.

Unauthorized removal of the head, therefore, could be dangerous due to the large potential energy of the power spring. In addition, unauthorized replacement of the head could result in a poor diaphragm seal or other internal defects. Therefore, it is conventional to discourage unauthorized removal and replacement of the head by attaching a warning label and/or providing a securing means which is tamper-resistant or at least tamper-evident, such that a new securing means, not readily available to unauthorized personnel is required before the head can be reattached.

Various approaches have been heretofore proposed for securing the brake actuator head to the flange case to prevent improvident disassembly of the two parts. GB Patent No. 2,000,225, for example, discloses in one embodiment a brake actuator including a head secured to a flange case with a circlip. The circlip is seated in an inwardly facing groove of the flange case and extends over an annular lip of the head, such that the head can only be separated from the flange case by deforming or destroying the flange case. The circlip, however, is accessible from between the flange case and an edge of the head and, therefore, could possibly be tampered with. Moreover, the design is complex, and therefore difficult and costly to manufacture and assemble.

The '225 patent, in another embodiment, also discloses a brake actuator including a head having a lower edge that is spun, or inelastically deformed, over a flange case, such that the head can only be separated from the flange case by deforming or destroying the lower edge of the head. Similar arrangements are also disclosed in U.S. Pat. Nos. 4,850,263, 4,960,036, 5,067,391, 5,205,205, 5,263,403, 5,311,809, 5,433,138, and 5,640,894. A disadvantage of each of these prior art references is that special deforming machinery is needed to assemble the brake actuator, making assembly both costly and difficult. Another disadvantage is that the deformed lower edge of the head can easily be undeformed by an unauthorized person attempting to disassemble the brake actuator.

U.S. Pat. No. 5,285,716 discloses a brake actuator having a head and a flange case welded together in a tamper-proof manner. As disclosed in the patent, however, it is a relatively easy task to grind away the weld to remove the head. In addition, the flange case must disadvantageously be made of steel in order to be welded to the steel head. Flange cases are normally made of aluminum.

U.S. Pat. Nos. 5,315,918 and 5,353,688 both disclose, in one embodiment, a brake actuator including a head screwed onto a flange case and secured with an insert or a pin creating an interference fit. The insert or pin may be welded in place. In another embodiment of the '918 and '688 patents, and in U.S. Pat. No. 4,887,513, a brake actuator is disclosed having a head which is joined to a flange case with a bayonet connection. U.S. Pat. No. 5,560,280 discloses a spring chamber head and adapter head, which include a plurality of cooperating peripheral lugs and flanges thereon. The flanges are held in registration with the lugs by the compression of the periphery of the spring brake diaphragm between the heads. A disadvantage of each of these prior art references is that the design is complex, and therefore difficult and costly to manufacture and assemble. A related disadvantage is that special and complex machinery is needed to assemble the brake actuator, making assembly even more costly and difficult.

What is desired, therefore, is a spring brake actuator which is tamper resistant, which is simple in design as compared with known spring brake actuators, which is relatively easy and inexpensive to produce and assemble, which does not require special machinery to assemble, and which can be made of conventional materials.

SUMMARY OF THE INVENTION

Accordingly, it is an object of the present invention to provide a spring brake actuator which is tamper resistant.

Another object of the present invention is to provide a spring brake actuator having the above characteristics and which is simple in design as compared with known spring brake actuators.

A further object of the present invention is to provide a spring brake actuator having the above characteristics and which is relatively easy and inexpensive to produce and assemble.

Still another object of the present invention is to provide a spring brake actuator having the above characteristics and which does not require special machinery to assemble.

Yet a further object of the present invention is to provide a spring brake actuator having the above characteristics and which can be made of conventional materials.

These and other objects of the present invention are achieved by provision of a spring brake actuator having a flange case and a head. The flange case and the head each have a radially outwardly extending annular flange having a plurality of radially spaced apart axial holes passing therethrough which correspond to and align with each other. A diaphragm is clamped in a fluid tight manner between the annular flange of the head and the annular flange of the flange case. A plurality of disassembleable fastening members pass through the holes in the annular flange of the head and the holes in the annular flange of the flange case in order to undetachably secure the head on the flange case.

In one embodiment, the disassembleable fastening members are rivets, while in another embodiment, the disassembleable fastening members are disassembleable nut and bolt pairs, wherein the nuts are preferably welded to the bolts.

Preferably, the diaphragm includes a periphery which comprises an annular widened portion having a thickness greater than a thickness of the remainder of the diaphragm. When such is the case, the annular flange of the head may further comprises an annular groove adapted to receive the annular widened portion of the periphery of the diaphragm. The annular groove may be defined, for example, by bends in metal defining the flange in which the groove is formed. The annular flange of the flange case may also further comprise an annular groove adapted to receive the annular widened portion of the periphery of the diaphragm. The annular groove may be defined by two annularly extending flange portions with an axially extending flange portion extending therebetween, which together define the annular flange of the flange case.

In another aspect, the present invention relates to a method of assembling such a spring brake actuator.

The invention and its particular features and advantages will become more apparent from the following detailed description considered with reference to the accompanying drawings.

DETAILED DESCRIPTION OF THE INVENTION

Figure 1:
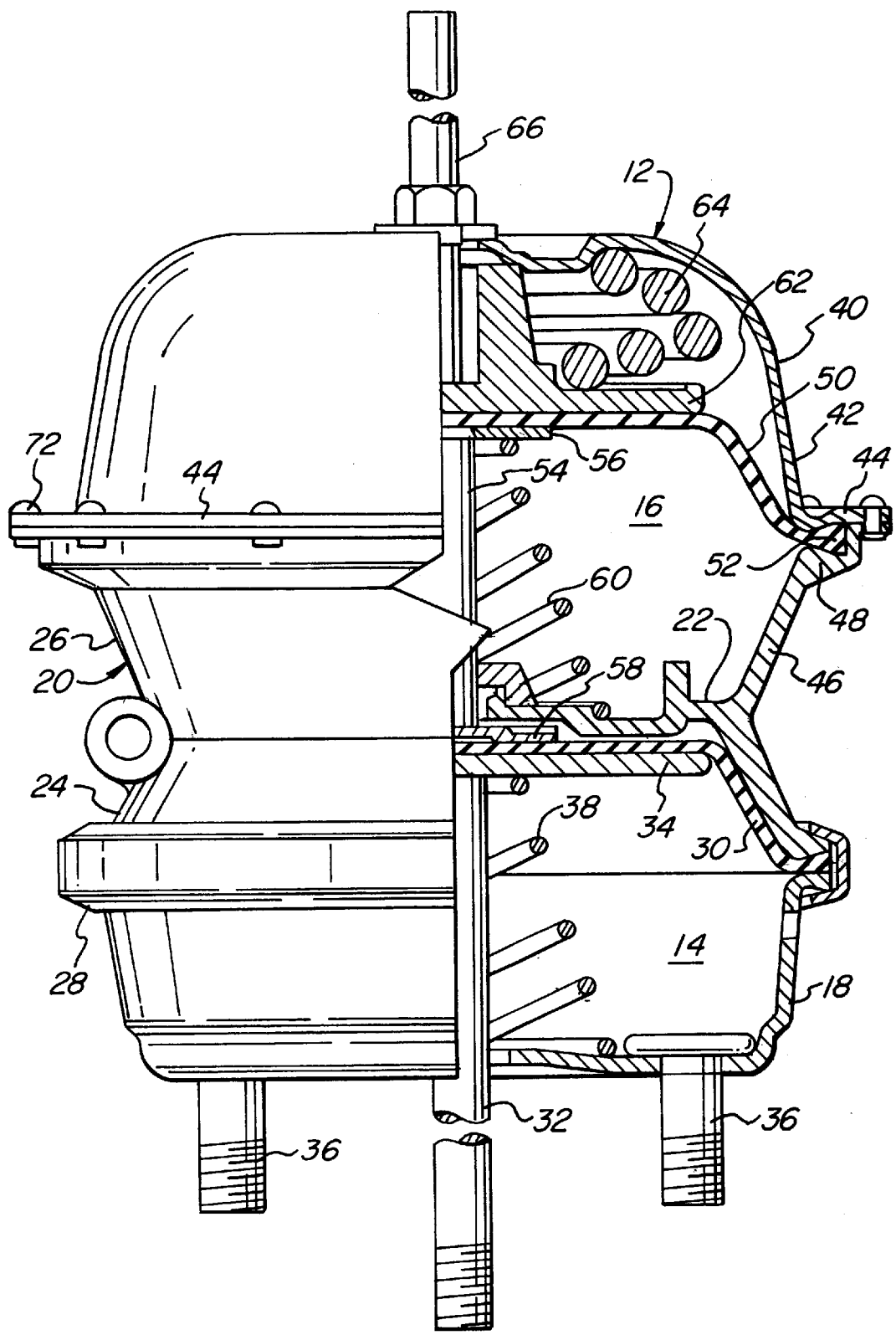
FIG. 1 is a side elevation view, partially in section, of a spring brake actuator in accordance with the present invention.
Figure 2:
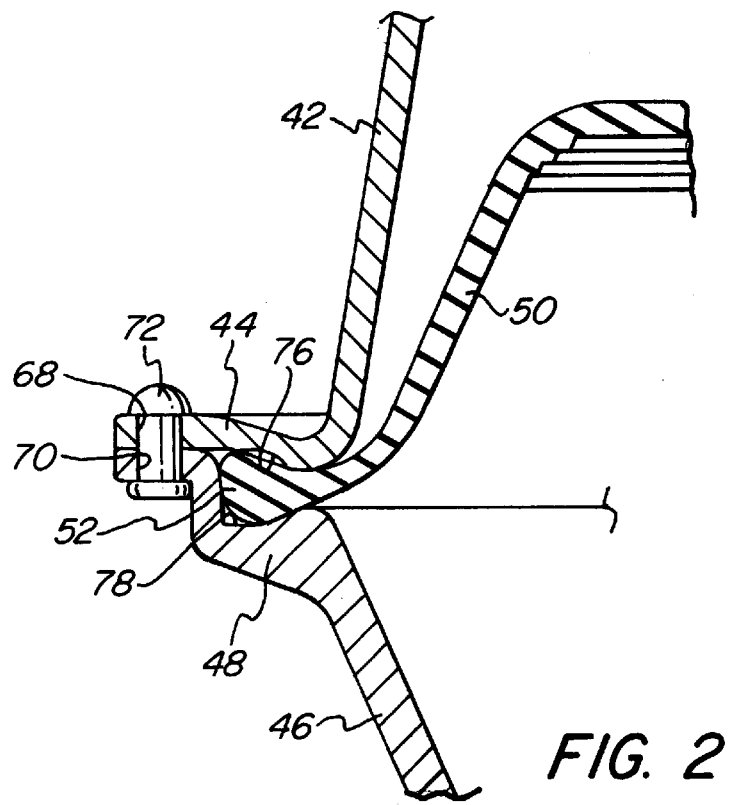
FIG. 2 is an enlarged side sectional view of a portion of the spring brake actuator of FIG. 1.
Figure 3:
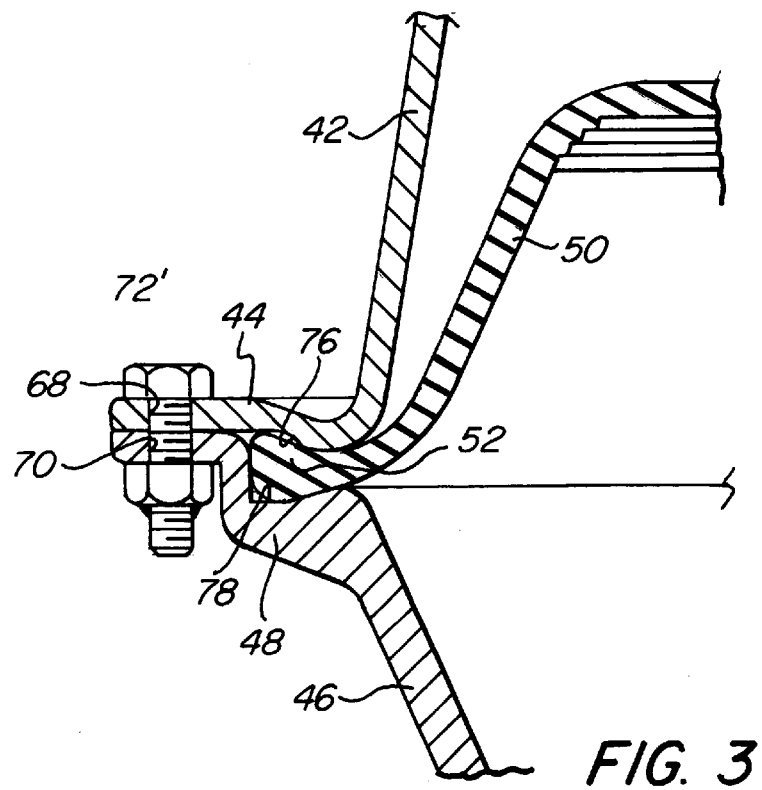
FIG. 3 is an enlarged side sectional view of a portion of a spring brake actuator in accordance with another embodiment of the present invention.
Figure 4:
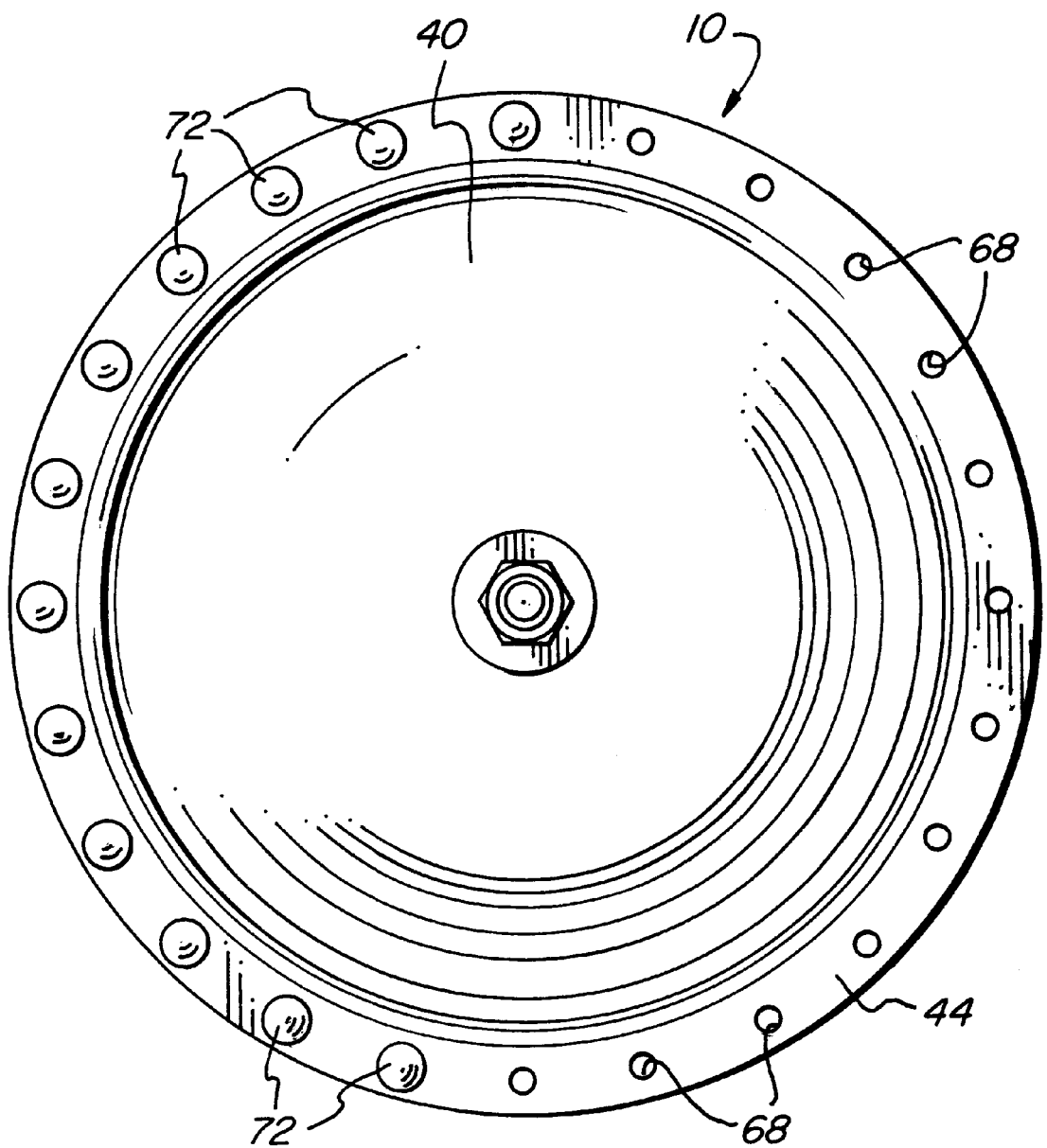
FIG. 4 is a top plan view of the spring brake actuator of FIG. 1.

Referring to FIGS. 1 through 4, a brake actuator 10 according to the present invention is shown. The embodiment shown is an air-operated dual diaphragm spring brake actuator 10, which includes a housing 12 containing a service chamber 14 and a spring chamber 16 in tandem. The service chamber 14 is defined by a cup-shaped service housing 18 and a flange case 20. The flange case 20 is double cup-shaped and includes a divider wall 22 separating a service side 24 of the flange case 20 from a spring side 26 of the flange case 20. The service housing 18 is secured to the service side 24 of the flange case 20 using a conventional bolted clamp 28, or any other of numerous means as are known in the art. An elastomeric service brake diaphragm 30 is clamped in fluid tight engagement between the service housing 18 and the service side 24 of the flange case 20. Although not shown, an aperture is provided in the flange case 20 for providing communication between a source of compressed air and a portion of the service chamber 14 between the diaphragm 30 and the divider wall 22 of the flange case 20, also as is known in the art.

A service push rod 32 extends through the service housing 18 into the service chamber 14, and mounts a service push rod plate 34 at an inner end thereof. The service push rod 32 has a threaded outer end for connection to the braking system of a vehicle. In addition, bolts 36 are provided for mounting the service housing 18 to the vehicle. A service return spring 38 extends between the service housing 18 and the service push rod plate 34 to bias the service push rod plate 34 and thus the service push rod 32 into the service chamber 14 to release the brake. The spring biased service push rod plate 34 normally forces the service brake diaphragm 30 against the divider wall 22 of the flange case 20 in the brake release position.

When air pressure is supplied through the aperture in the service side 24 of the flange case 20 as, for example, when the brakes are applied by a vehicle operator, compressed air is introduced between the service brake diaphragm 30 and the divider wall 22, thereby forcing the diaphragm toward the service housing 18. In this manner, the service push rod 32 is extended outwardly of the service chamber 14 to apply braking pressure to the vehicle brakes in a conventional fashion.

The spring chamber 16 is defined by the spring side 26 of the flange case 20 and a head 40. The head 40 includes a sidewall 42, which is preferably cylindrical or frustoconical, having an annular flange 44 outwardly extending therefrom. Similarly, spring side 26 of flange case 20 includes a sidewall 46, which is preferably cylindrical or frustoconical, having an annular flange 48 outwardly extending therefrom. Head 40 is secured to the spring side 26 of the flange case 20, as described below in detail. A spring diaphragm 50 has a periphery 52 clamped in a fluid tight manner between annular flange 44 of head 40 and annular flange 48 of the spring side 26 of the flange case 20, also as described below in detail.

An aperture (not shown) is provided within the spring side 26 of the flange case 20 to connect a portion of the spring chamber 16 between the dividing wall 22 and the spring diaphragm 50 with a source of compressed air (not shown). A flange case push rod 54 extends between the spring chamber 16 and the service chamber 14, and has a first reaction plate 56 rigidly mounted to one end, and a second reaction plate 58 mounted to the other end thereof. A return spring 60 is mounted within the spring chamber 16 between the divider wall 22 and the first reaction plate 56 to bias the flange case push rod 54 into the release position.

A pressure plate 62 bears against the spring diaphragm 50, and a power spring 64 is positioned between the pressure plate 62 and the head 40 to bias the pressure plate 62 and the push rods 32,54 to a brake actuating position. The flange case 20 is typically cast aluminum and the head 40 is typically stamped or spun low-carbon steel. The actuator 10 may include a release tool 66 that extends within the head 40 for mechanically drawing the pressure plate 62 against the head 40 such that the power spring 64 assumes a retracted or "caged" position. The release tool 66 can thus mechanically release the brake after a loss of power or air pressure, as is known in the art.

In operation, air pressure is continually supplied to the spring chamber 16 through the aperture (not shown) to maintain the spring diaphragm 50 in a position to compress the power spring 64. In this position, the service push rod 32 normally is operated as described above by selective pressurization of air into the service chamber 14. However, in the event of failure of the air pressure system, the pressure in the spring chamber 16 will be decreased so that the service return spring 38 and flange case return spring 60 would no longer be able to overcome the pressure of the much larger and stronger power spring 64. Thus, the pressure plate 62 forces the spring diaphragm 50 and thus the flange case push rod 54 outwardly, thereby also forcing the service push rod 32 outwardly to apply braking pressure to the brakes.

The power spring 64, therefore, must be compressed between the pressure plate 62 and the head 40 during normal driving and normal service brake mode, as shown in FIG. 1. In these modes, the power spring 64 exerts substantial force on head 40 in the direction away from flange case 20, such that improvident or unauthorized removal of the head 40 could cause the head 40 to separate from the flange case 20 with considerable force.

The present invention inhibits and discourages improvident removal of the head 40 by providing an arrangement that permanently secures the head 40 to the flange case 20. Annular flange 44 of head 40 is provided with a plurality of radially spaced apart axial holes 68, which correspond to and align with a plurality of radially spaced apart axial holes 70 provided in annular flange 48 of spring side 26 of flange case 20. A plurality of disassembleable fastening members 72 which pass through holes 68 in annular flange 44 of head 40 and holes 70 in annular flange 48 of flange case 20, are provided in order to permanently secure head 40 on flange case 20. By disassembleable, what is meant is that once fastening members 72 are assembled, they cannot be disassembled and reused, and that in order to remove fastening members 72, fastening members 72 must be rendered inoperative or destroyed.

Fastening members 72 may comprise any of known fasteners for permanently securing one member to another. For example, in the embodiment shown in FIGS. 1, 2 and 4, fastening members 72 comprise rivets. The rivets may be standard rivets, as shown in the FIGS., self piercing rivets, such as those distributed by Emhart Industries Inc. of Shelton, Conn., blind rivets, such as those distributed by Huck International Inc. of Tucson, Ariz., or any of numerous other types of rivets. In another exemplary embodiment shown in FIG. 3, fastening members 72' comprise bolts with corresponding nuts. In this embodiment, nuts are preferable permanently affixed to bolts after assembly, by welding or the like, or may comprise other known types of permanent nut/bolt combinations, such as lockbolts or the like, such as those distributed by Huck International Inc. of Tucson, Ariz.

Periphery 52 of spring diaphragm 50 may comprise an annular widened portion 74 having a thickness greater than the thickness of the remainder of spring diaphragm 50 in order to facilitate the retention of spring diaphragm between annular flange 44 of head 40 and annular flange 48 of flange case 20. When such is the case, annular flange 44 of head 40 preferably defines an annular groove 76 and annular flange 48 preferably defines an annular groove 78, which annular grooves 76,78 oppose and face each other. The annular grooves 76,78 are sized and shaped to receive the annular widened portion 74 of periphery 52 of spring diaphragm 50.

Annular grooves 76,78 may be formed in any of numerous ways. For example, and as illustrated in the Figures with respect to annular groove 76 in annular flange 44, the annular grooves may be formed simply by bending the metal defining the flange in which the groove is formed. Another way to form the grooves is illustrated in the Figures with respect to annular groove 78 in annular flange 48. In this example, annular flange 48 is comprised of two annularly extending flange portions 80,82 with an axially extending flange portion 84 extending therebetween. Inner surfaces of annularly extending flange portions 80,82 and axially extending flange portion 84 together define annular groove 78.

In order to assemble the head 40 and the flange case 20, periphery 52 of spring diaphragm 50 is seated between annular groove 76 in annular flange 44 and annular groove 78 in annular flange 48 and enough compressive force is applied to overcome the spring forces of springs 38,60,64 and to bring flange 44 of the head 40 in contact with flange 48 of spring side 26 of flange case 20. The holes in flange 44 and flange 48 are then aligned, and fastening members 72 are passed through holes in order to permanently join head 40 and flange case 20. The compressive forces are then removed.

The present invention, therefore, provides a spring brake actuator which is tamper resistant, which is simple in design as compared with known spring brake actuators, which is relatively easy and inexpensive to produce and assemble, which does not require special machinery to assemble, and which can be made of conventional materials.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A spring brake actuator comprising:
   a flange case, said flange case having a radially outwardly extending annular flange having a plurality of radially spaced apart axial holes passing therethrough;
   a head, said head having a radially outwardly extending annular flange having a plurality of radially spaced apart axial holes passing therethrough, the plurality of holes in the annular flange of said head corresponding to and aligning with the plurality of holes in the annular flange of said flange case;
   a diaphragm clamped in a fluid tight manner between the annular flange of said head and the annular flange of said flange case; and
   a plurality of fastening members passing through the holes in the annular flange of said head and the holes in the annular flange of said flange case in order to undetachably secure said head on said flange case;
   wherein said plurality of fastening members, once assembled, cannot be reused or removed without rendering said plurality of fastening members inoperative.

2. The spring brake actuator of claim 1 wherein said fastening members comprise rivets.

3. The spring brake actuator of claim 1 wherein said fastening members comprise non-removable nut and bolt pairs.

4. The spring brake actuator of claim 3 wherein said nut and bolt pairs comprise nut and bolt pairs wherein the nuts are welded to the bolts.

5. The spring brake actuator of claim 1 wherein said diaphragm includes a periphery which comprises an annular widened portion having a thickness greater than a thickness of the remainder of said diaphragm.

6. The spring brake actuator of claim 5 wherein the annular flange of said head further comprises an annular groove adapted to receive the annular widened portion of the periphery of said diaphragm.

7. The spring brake actuator of claim 6 wherein the annular groove is defined by bends in metal defining the flange in which the groove is formed.

8. The spring brake actuator of claim 5 wherein the annular flange of said flange case further comprises an annular groove adapted to receive the annular widened portion of the periphery of said diaphragm.

9. The spring brake actuator of claim 8 wherein the annular flange of said flange case comprises two annularly extending flange portions with an axially extending flange portion extending therebetween, and wherein the annular groove is defined by the two annularly extending flange portions and the axially extending flange portion.

10. A two-chamber air brake actuator comprising:

a service chamber assembly; and a spring brake assembly joined in tandem with said service chamber assembly, said spring brake assembly comprising:

a flange case, said flange case having a radially outwardly extending annular flange having a plurality of radially spaced apart axial holes passing therethrough;

a head, said head having a radially outwardly extending annular flange having a plurality of radially spaced apart axial holes passing therethrough, the plurality of holes in the annular flange of said head corresponding to and aligning with the plurality of holes in the annular flange of said flange case;

a diaphragm clamped in a fluid tight manner between the annular flange of said head and the annular flange of said flange case; and a plurality of fastening members passing through the holes in the annular flange of said head and the holes in the annular flange of said flange case in order to undetachably secure said head on said flange case;

wherein said plurality of fastening members, once assembled, cannot be reused or removed without rendering said plurality of fastening members inoperative.

11. The air brake actuator of claim 10 wherein said fastening members comprise rivets.

12. The air brake actuator of claim 10 wherein said fastening members comprise nut and bolt pairs.

13. The air brake actuator of claim 12 wherein said nut and bolt pairs comprise nut and bolt pairs wherein the nuts are welded to the bolts.

14. The air brake actuator of claim 10 wherein said diaphragm includes a periphery which comprises an annular widened portion having a thickness greater than a thickness of the remainder of said diaphragm.

15. The air brake actuator of claim 14 wherein the annular flange of said head further comprises an annular groove adapted to receive the annular widened portion of the periphery of said diaphragm.

16. The air brake actuator of claim 15 wherein the annular groove is defined by bends in metal defining the flange in which the groove is formed.

17. The air brake actuator of claim 14 wherein the annular flange of said flange case further comprises an annular groove adapted to receive the annular widened portion of the periphery of said diaphragm.

18. The air brake actuator of claim 17 wherein the annular flange of said flange case comprises two annularly extending flange portions with an axially extending flange portion extending therebetween, and wherein the annular groove is defined by the two annularly extending flange portions and the axially extending flange portion.

19. A method of assembling a spring brake actuator comprising the steps of:

providing a flange case, the flange case having a radially outwardly extending annular flange;

providing a head, the head having a radially outwardly extending annular flange;

creating a plurality of radially spaced apart axial holes passing through the annular flange of the flange case and creating a plurality of radially spaced apart axial holes passing through the annular flange in the head, the plurality of holes in the annular flange of the head corresponding to the plurality of holes in the annular flange of the flange case;

providing a diaphragm and compressing the head and the flange case together with the diaphragm disposed therebetween until the annular flange of the head and the annular flange of the flange case abut each other with the diaphragm clamped in a fluid tight manner therebetween and with the holes in the annular flange of the head aligned with the holes in the annular flange of the flange case; and passing a plurality of fastening members through the holes in the annular flange of the head and the holes in the annular flange of the flange case and undetachably securing the head on the flange case therewith;

wherein said plurality of fastening members, once assembled, cannot be reused or removed without rendering said plurality of fastening members inoperative.

20. The method of claim 19 wherein said passing step comprises the step of riveting the annular flange of the head to the annular flange of the flange case by passing rivets through the holes therein in order to undetachably secure the head on the flange case.

21. The method of claim 19 wherein said passing step comprises the step of bolting the annular flange of the head to the annular flange of the flange case by passing nut and bolt pairs through the holes therein in order to undetachably secure the head on the flange case.

22. The method of claim 21 further comprising the step of welding the nuts onto the bolts.

\* \* \* \* \*